United States Patent [19]
McClintic

[11] Patent Number: 6,050,823
[45] Date of Patent: Apr. 18, 2000

[54] MOTION SIMULATOR OPERATING SYSTEM AND METHOD

[76] Inventor: Frank McClintic, 1575 Priscilla Ct., Toms River, N.J. 08752

[21] Appl. No.: 09/136,250

[22] Filed: Aug. 19, 1998

Related U.S. Application Data

[63] Continuation-in-part of application No. 08/760,485, Dec. 5, 1996, Pat. No. 5,827,065.

[51] Int. Cl.$^7$ .................................................. A63G 31/02
[52] U.S. Cl. ............................................... 434/29; 434/30
[58] Field of Search ................................ 434/29, 30, 55, 434/61–63, 65, 69; 472/38, 43–47; 104/35, 36, 53, 85, 154

[56] References Cited

U.S. PATENT DOCUMENTS

| | | |
|---|---|---|
| 5,403,238 | 4/1995 | Baxter et al. . |
| 5,449,920 | 9/1995 | Trumbull . |
| 5,473,990 | 12/1995 | Anderson et al. ...................... 472/43 |
| 5,499,920 | 3/1996 | Trumbull .............................. 434/69 |
| 5,583,844 | 12/1996 | Wolf et al. ........................... 472/43 |

OTHER PUBLICATIONS

Disney, *Thrill Seeker's Guide*, 1993.
Scholastic, Inc., Turtles Talk Logo Book 1, 1984.
Scholastic, Inc., Turtles Talk Logo Book 2, 1984.

*Primary Examiner*—Glenn E. Richman
*Attorney, Agent, or Firm*—Gibbons, Deldeo, Dolan, Griffinger & Vecchione

[57] ABSTRACT

A control system for a motion simulator and the associated method of operating the motion simulator. The control system contains a memory. Within the memory is a plurality of pre-programmed maneuvers that are capable of being simulated by the motion simulator. An interface is provided that enables a person to select some of the pre-programmed maneuvers from the memory in a desired sequence, prior to that person entering the motion simulator. Once a certain sequence of maneuvers is selected, the motion simulator simulates those maneuvers in the chosen sequence. This enables each rider of the motion simulator to design his/her own simulation each time that person uses the motion simulator. The control system also enables a rider to program the motion simulator at the sight of the motion simulator or at home, via a personal computer. As such, a rider can select a sequence of maneuvers and create a ride at home and carry the selected sequences to the motion simulator on disk or send the selected sequences to the motion simulator via a telecommunications link.

22 Claims, 3 Drawing Sheets

MOTION SIMULATOR OPERATING SYSTEM AND METHOD

This application is a continuation in part of Ser. No. 08/760,485 filed Dec. 5, 1996 now Pat. No. 5,827,065.

BACKGROUND OF THE INVENTION

1. Field of the Invention

The present invention relates to the operating systems used to control motion simulators and the methods used to program the movements of a motion simulator.

2. Description of the Prior Art

Motion simulators are used in many applications to both train and entertain people. In both training based simulators and entertainment based simulators, motion mechanisms are used to physically move the person in the simulator in a variety of different directions. The primary difference between training simulators and entertainment simulators is typically the control systems used to operate the simulator. In training simulators, such as flight simulators, the controls for operating the simulator are mostly occupant controlled. As a result, the motion of the simulator depends directly from the operation of the controls within the simulator by the simulator occupant. Such prior art simulator systems are exemplified by U.S. Pat. No. 5,453,011 to Feuer et al., entitled FLIGHT SIMULATOR and U.S. Pat. No. 5,453,011 to Pancoe, entitled MOTION SYSTEM FOR A FLIGHT SIMULATOR.

Entertainment based motion simulators typically assume that the occupant of the simulator is unskilled. As such, entertainment based motion simulators differ from training based simulators in that they often do not provide the simulator occupant with any operational controls. Entertainment based motion simulators are often configured to simulate traditional amusement park rides, such as roller coasters and the like, that do not have occupant controls. In such simulators, the occupant is merely a rider who receives amusement from the ride. As a result, in such simulators the occupant experiences a sequence of movements that are pre-programmed into the motion simulator. Each time a rider enters the motion simulator, the rider experiences the exact same ride. Such entertainment based motion simulators are exemplified by U.S. Pat. No. 5,403,238 to Baxter et al., entitled AMUSEMENT PARK ATTRACTION; and U.S. Pat. No. 5,473,990 to Anderson et al, entitled RIDE VEHICLE CONTROL SYSTEM.

It is well known in the art that in a motion simulator there are three separate systems that must be coordinated in order to properly simulate movement. These systems include the visual imagery system, the audio sound system and the physical motion system. If any one of these three systems is not synchronized with the other two, then the realism of the simulation is compromised. Entertainment based motion simulators tend to be much less sophisticated and expensive than are training based motion simulators because in entertainment based motion simulators the visual images, audio sounds and physical motions are exactly the same in every simulation. Since the simulated ride remains constant, the visual images, audio sounds and physical movements are easily stored and retrieved by the control system of the motion simulator. However, in order to change the simulated ride, new imagery must be obtained, a new audio track must be recorded and the motion simulator must be reprogrammed with new movements. As a result, if an amusement provider wants to make a change in a set simulated ride, there is a significant amount of labor and cost involved in the process.

Training based motion simulators do not have one set visual system, audio system or motion sequence. As a result, no two simulations need to be the same. This however, requires a highly sophisticated operational control system so that the changing visuals audio and motions systems can be kept coordinated. The sophisticated operational control system is expensive, as is the upkeep to the associated equipment.

Simulated rides are becoming more popular forms of entertainment. Owners of simulated rides recognize the benefit of simulated rides in that they are far less expensive than building real rides and they are safer than real rides. A problem with all amusement rides is that of rider familiarity. After a person rides a ride, that ride becomes familiar. As such, there is less of a reason for that person to ride that ride again for the second or third time. Furthermore, as a ride is repeatedly rode upon, the excitement and sense of anticipation provided by the ride is diminished. Eventually, the sense of thrill is lost and there is no incentive for a person to ride that ride or even return to the location that provides that ride.

A need therefore exists in the art for a simulated ride that can be inexpensively manufactured that would enable the simulated ride to be varied every time a person rides the ride. In such a ride, the sense of thrill and anticipation provided by the ride is never lost and a rider is provided with an incentive to ride the ride over and over.

A need also exists for a simulated ride that enables the occupant to selectively alter the ride prior to its start, without requiring a complex, expensive operating system to provide the coordinated visual, audio and movement sequences needed to produce the simulation.

These needs are met by the present invention as described and claimed below.

SUMMARY OF THE INVENTION

The present invention is a control system for a motion simulator and the associated method of operating the motion simulator. The present invention is used in association with a motion simulator that is capable of simulating certain maneuvers. The control system contains a memory. Within the memory is a plurality of pre-programmed maneuvers that are capable of being simulated by the motion simulator. An interface is provided that enables a person to select some of the pre-programed maneuvers from the memory in a desired sequence, prior to that person entering the motion simulator. Once a certain sequence of maneuvers is selected, the motion simulator simulates those maneuvers in the chosen sequence. This enables each rider of the motion simulator to design his/her own simulation each time that person uses the motion simulator. The control system also enables a rider to program the motion simulator at the eight of the motion simulator or at home, via a personal computer. As such, a rider can select a sequence of maneuvers and create a ride at home and carry the selected sequences to the motion simulator on disk or send the selected sequences to the motion simulator via a telecommunications link.

BRIEF DESCRIPTIONS OF THE DRAWINGS

For a better understanding of the present invention, reference is made to the following description of an exemplary embodiment thereof, considered in conjunction with the accompanying drawings, in which.

DETAILED DESCRIPTION OF THE DRAWINGS

Although the present invention motion simulator control system can be used with any motion simulator that is capable of simulating an amusement ride, by way of example the present invention simulator control system will be described in association with a motion simulator that is designed to simulate a roller coaster. Such a configuration is presented merely for exemplary purposes and is not intended in any manner to limit the application of the present invention simulator control system to just one type of ride.

Figure 1:
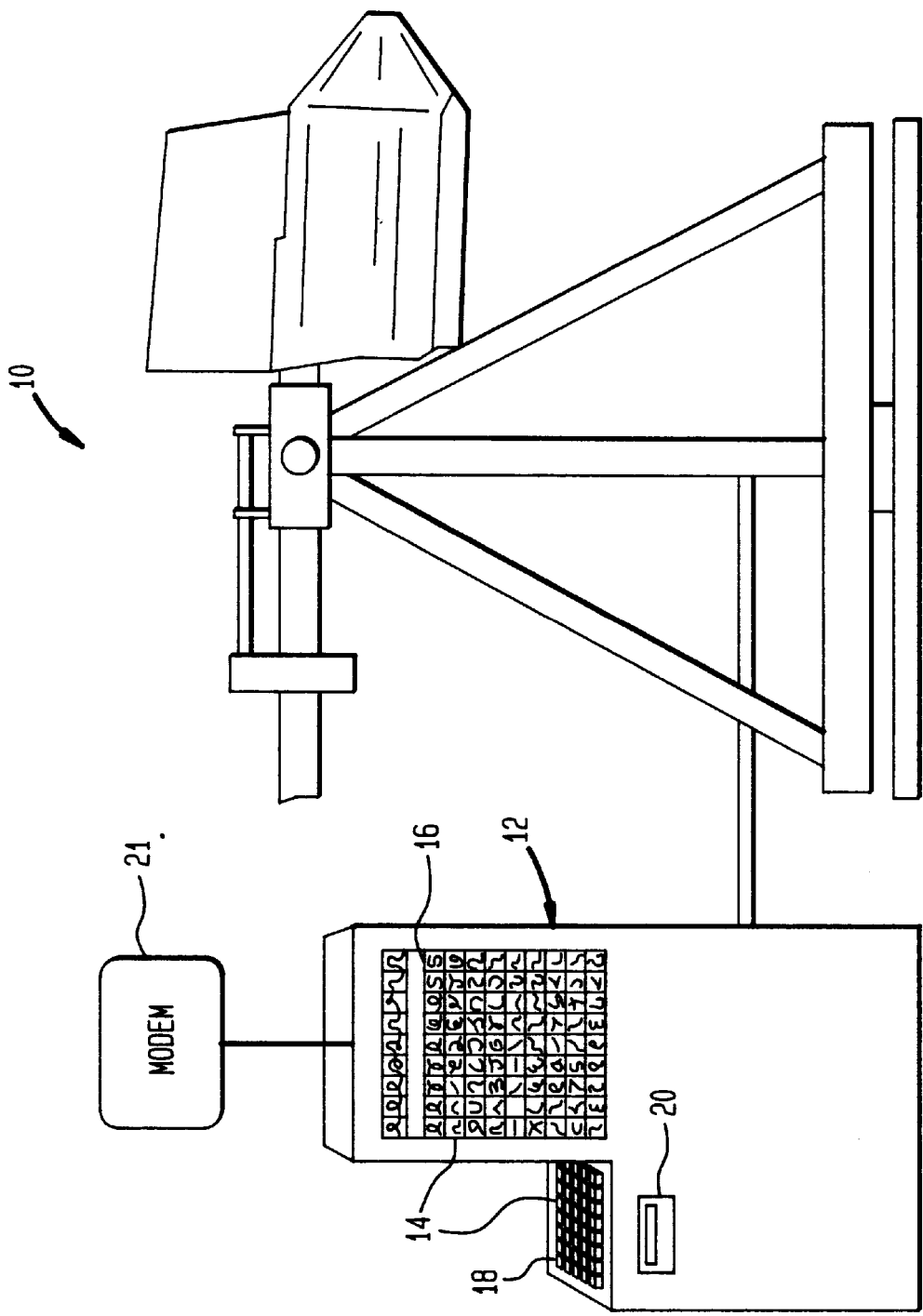
FIG. 1 shows an exemplary embodiment of a motion simulator and simulator control system in accordance with the present invention.

Referring to FIG. 1., a notion simulator 10 is shown. The motion simulator 10 can be of any type known in the art. However, in the preferred embodiment, the motion simulator 10 is of the type described in U.S. patent application No. 08/383,992, entitled IMPROVED MOTION SIMULATOR, which is assigned to the assignee herein and is herein incorporated into this disclosure by reference. The motion simulator 10 is coupled to a central controller 12 that contains the present invention control system and performs the present invention operating method.

In the shown embodiment, the central controller 12 acts as the interface that enables a rider to selectively program the motion simulator 10 to a custom specification. In accordance with the present invention, the central controller 12 can be programmed in at least one of three different ways by each rider. The first way to program the central controller 12 is to program the central controller 12 at the sight of the motion simulator 10. To program the central controller 12 on-sight, an interface system 14 such as a touch screen 16 or a key board 18 is provided on the central controller 12. Using the interface system 14, a rider can selectively create and/or select a simulated ride to be preformed by the motion simulator 10. A second way to program the central controller 12 is to provide the central controller 12 with a disk drive 20 or a similar device capable or reading recorded data. The disk drive 20 enables a rider to download a previously created program for a simulated ride that was created at a remote location and was carried to the motion simulator 10. Lastly, the rider can retrieve a previously created program that was downloaded to the central controller 12 through a modem 21, via the internet or a direct telephone connection from the rider's own personal computer. Each of these programming options will be further explained in the course of this disclosure.

Figure 2:
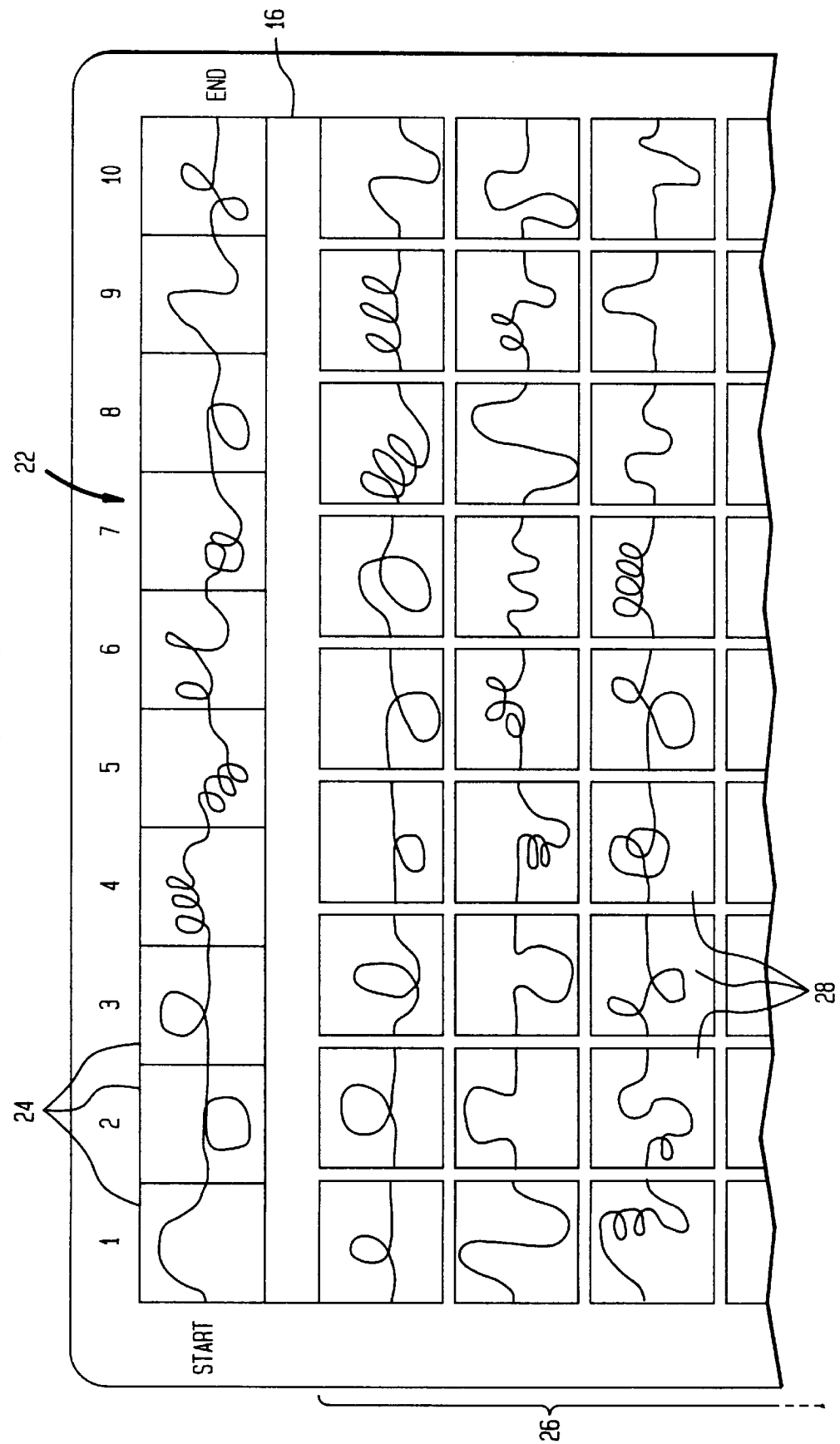
FIG. 2 is an enlarged fragmented view of a section of the display and selection grid used on the exemplary simulator control system of FIG. 1.

Referring to FIG. 2, a segment of an exemplary embodiment of the central controller's interface system is illustrated. In the shown embodiment, the interface system is a touch screen 16. At the top of the touch screen 16 is a simulated ride display box 22. The simulated ride display box 22 is segmented into ten sections 24 by way of example. However, any plurality of segments can be used. By presenting a simulated ride display box 22 with ten sections 24, a rider is provided with the ability to select ten different aspects of the simulated ride. In each of the sections 24 of the simulated ride display box 22 is contained a graphical representation that illustrates a preprogrammed maneuver that the motion simulator 10 (FIG. 1) will eventually follow. By stringing together ten separate maneuvers in the simulated ride display box 22, a graphical representation is obtained that illustrates all the maneuvers the motion simulator 10 (FIG. 1) will follow from start to finish.

Below the simulated ride box 22 is the selection field 26. In the selection field 26 there is contained a plurality of maneuver boxes 28, wherein each of the maneuver boxes 28 contains a different maneuver. Since the exemplary embodiment shown is for a roller coaster simulator, each of the maneuver boxes 28 in the selection field 26 contains a different segment of roller coaster track. Each segment of track is different. As a result, each maneuver box 28 in the selection field 26 represents a different motion maneuver to be performed by the motion simulator 10 (FIG. 1).

Each of the plurality of different maneuvers represented by the images in the maneuver boxes 28 of the selection field 26 contains a combination or physical movements capable of being performed by the motion simulator 10 (FIG. 1). As such, if the motion simulator used was limited to only certain motions, maneuvers containing only those motions would be presented.

When first accessed by a rider, the different sections 24 of the simulated ride box 22 are empty or contain some popular default maneuvers. By selecting the different sections 24 in the simulated ride box 22 and then selecting different maneuver boxes 28 in the selection field 26, any desired string of maneuvers boxes 28 can be created in the simulated ride box 22. In order for the maneuvers represented by any two maneuver boxes 28 to work together, the maneuvers represented by each maneuver box 28 must begin and end with the motion simulator 10 (FIG. 1) in the same orientation. By beginning and ending each motion simulator maneuver at the same orientation, there is no sudden change in motion simulator's orientation as the maneuver represented by one maneuver box ends and the maneuver represented by a second selection box begins. This provides for a continuous simulated ride that does not have disruptions from its beginning to its end, regardless of the sequence of maneuvers selected. In the shown embodiment, each maneuver box 28 starts and ends with a maneuver that places the motion simulator in a horizontal forward facing orientation. Such an orientation is exemplary and it should be understood that any orientation can be used provided that orientation begins and ends each of the maneuvers represented by the maneuver boxes 26.

Figure 3:
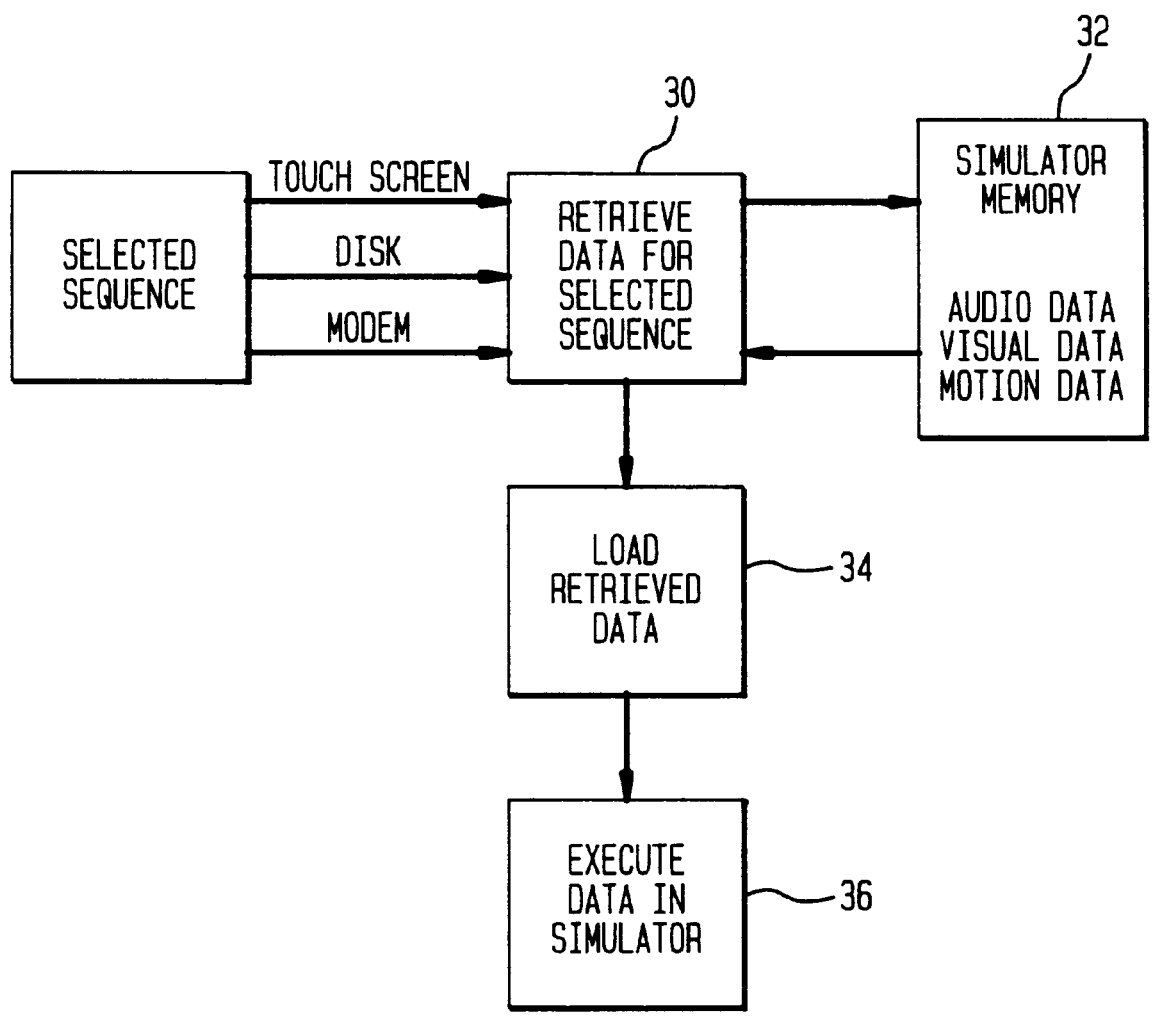
FIG. 3 is a logic flow bock diagram schematic for the simulator control system of the present invention.

Referring to FIG. 3, it can be seen that once the segments of the simulated ride box 22 (FIG. 2) are filled with a selected sequence of maneuvers, the central controller reads the selected sequence, as indicated by box 30. Once read, the central controller downloads data from a memory source 32 that corresponds to each of the maneuvers selected. For each maneuver selected, the corresponding visual information, audio information and motion sequence information is retrieved. Since the only choices of maneuvers are those represented in the maneuver boxes 28 (FIG. 2) in the selection field 26 (FIG. 2), the memory source 32 contains a finite number of maneuvers. Accordingly, a large memory capacity is not required, nor is the sophisticated programming required of simulators that do not have limited maneuver choices.

Once the appropriate visual, audio and motion information is retrieved from the memory source 32 and sequenced, the data is loaded into motion simulator as is indicated by block 34. The central controller waits for an indication that the rider has entered the motion simulator and has been safety seated within the motion simulator. Such an indication can come from a ride operator or can come from sensors within the motion simulator. Once safely positioned within the motion simulator, the motion simulator begins to execute the selected maneuvers while coordinated images and sound are viewed and heard by the rider within the simulator. This is shown by block 36.

Returning to FIG. 1, it can be seen that the interface system 14 also optionally contains an alpha-numeric keypad 18. By using the alpha-numeric keypad 18, a rider can retrieve a sequence of maneuvers created on a home computer and carried to the motion simulator on a disk 40. The program needed to create the simulated ride at home can be mailed to the rider or downloaded via the modem 21 either from the internet or directly from the motion simulator owner.

An amusement provider can therefore have each rider custom program the motion simulator 10 to that rider's own specifications each time that rider rides the motion simulator 10. Consequently, the rider does not grow familiar with the ride offered by the motion simulator 10 and the simulator owner does not have to periodically reprogram the motion simulator 10 to keep the ride interesting. Furthermore by providing riders with the ability to program the motion simulator 10 at home, the amusement provider is providing a great incentive for that rider to travel to the location of the motion simulator time and time again in order to try the ride sequence that the rider has created.

It will be understood that the embodiments of the present invention specifically shown and described are merely exemplary and that a person skilled in the art can make alternate embodiments using different configurations and functionally equivalent components. All such alternate embodiments are intended to be included in the scope of this invention as set forth in the following claims.

What is claimed is:

1. A system for programming and controlling a motion simulator, comprising:
    memory containing a selection of different predetermined maneuvers capable of being simulated by the motion simulator;
    interface for selecting sequences from said selection of different predetermined maneuvers;
    linking means for linking said selected sequences into an assembled ride of predetermined maneuvers;
    transfer means for transferring said assembled ride of predetermined maneuvers to the motion simulator;
    wherein said assembled ride of predetermined maneuvers instructs the motion simulator to simulate said assembled ride of predetermined maneuvers.

2. The system according to claim 1, further including a display for displaying images illustrative of motion sequences of said assembled ride of predetermined maneuvers.

3. The system according to claim 2, wherein said interface includes a touch screen for selecting sequences from said selection of different predetermined by touching a location of an image corresponding to one of said selection of different predetermined maneuvers.

4. The system according to claim 1, wherein said interface including a disk drive, wherein said assembled ride of predetermined maneuvers are read from a disk via said disk drive.

5. The system according to claim 1, wherein said interface includes a modem, wherein said assembled ride of predetermined maneuvers are loaded at a remote location via modem.

6. The system according to claim 1, wherein said interface includes a keyboard selecting sequences from said selection of different predetermined of maneuvers from said memory.

7. The system according to claim 2, wherein the motion simulator simulates an amusement ride where a vehicle travels along a track and said images show segments of said track for said amusement ride.

8. The system according to claim 1, further including a display for displaying a graphical representation of said assembled ride of predetermined maneuvers.

9. A method of programming and operating a motion simulator comprising the steps of:
    providing a selection of different predetermined maneuvers capable of being simulated by the motion simulator;
    selecting sequences from said selection of different predetermined maneuvers;
    linking said selected sequences into an assembled ride of predetermined maneuvers;
    transferring said assembled ride of predetermined maneuvers to the motion simulator; and
    enabling the motion simulator to perform said assembled ride of predetermined maneuvers.

10. The method according to claim 8, further including the step of displaying a graphical representation illustrative of motion sequences of said assembled ride of predetermined maneuvers.

11. The method according to claim 9 wherein said different predetermined maneuvers correspond to visual information, audio information and motion sequence information for the motion simulator.

12. The method according to claim 9 wherein the step of assembling further comprises providing transitions between said selected sequences such that no sudden change in orientation occurs during said transitions.

13. The method according to claim 9, wherein said step of transferring includes the substeps of:
    downloading said assembled ride of predetermined maneuvers to a recordable medium and uploading said assembled ride of predetermined maneuvers to the motion simulator from said recordable medium.

14. The method according to claim 9, wherein said step of transferring includes the substeps of:
    using a telecommunication link to the motion simulator to transfer said assembled ride of predetermined maneuvers to the motion simulator.

15. A method of operating a motion simulator capable of carrying a rider, comprising the steps of:
    storing a plurality of predetermined maneuvers in a memory, wherein said motion simulator is capable of performing each of said predetermined maneuvers;
    having the rider select a sequence of some of said predetermined maneuvers from said memory;
    loading said sequence of predetermined maneuvers into the motion simulator;
    executing said sequence of predetermined maneuvers wherein the rider experiences said sequence of predetermined maneuvers.

16. The method according to claim 15, wherein each of said plurality of predetermined maneuvers begin and end with the motion simulator being in a common predetermined position.

17. The method according to claim 15, wherein said step of having the rider select a sequence of predetermined maneuvers includes the substeps of:
    displaying said plurality of predetermined maneuvers on a display; and
    selecting said sequence by referencing different predetermined maneuvers show on said display.

18. The method according to claim 15, wherein said step of having the rider select a sequence of predetermined maneuvers includes the substeps of:

selecting said sequence with a computer at a location remote from the motion simulator;

recording said sequence on a portable recording medium;

bringing said recording medium to the motion simulator; and loading said sequence from said recording medium to the motion simulator.

19. The method according to claim 15, wherein said step of having the rider select a sequence of predetermined maneuvers includes the substeps of:

identifying some of said predetermined maneuvers on a computer at a location remote from the motion simulator;

establishing a telecommunication link between said computer and the motion simulator; and downloading said identified predetermined maneuvers to the motion simulator over said telecommunications link.

20. The method according to claim 17, wherein the motion simulator simulates an amusement ride where a vehicle travels along a track and said display shows segments of track for said amusement ride.

21. The method according to claim 15, further comprising the step of displaying a graphical representation of said sequence of predetermined maneuvers.

22. The method according to claim 20 wherein said amusement ride is a roller coaster.

* * * * *